Patented Mar. 25, 1952

2,590,139

UNITED STATES PATENT OFFICE 2,590,139

PROCESS FOR PREPARING CRYSTALLINE STREPTOMYCIN HYDROCHLORIDE

Frank J. Wolf, Westfield, N. J., assignor to Merck & Co., Inc., Rahway, N. J., a corporation of New Jersey No Drawing. Application June 4, 1948, Serial No. 31,199

4 Claims. (Cl. 260—210)

This invention relates to the preparation of improved antibiotic substances and more particularly to the preparation of streptomycin hydrochloride in pure crystalline form.

The streptomycin compound which is probably best adapted for therapeutic use is streptomycin trihydrochloride (herein referred to as streptomycin hydrochloride). Most advantageous use of this material, however, has been impaired by the fact that it has heretofore been impossible to obtain the same in pure crystalline form. This presents difficulties in preparation because amorphous substances are inherently more difficult to purify than crystalline materials. With amorphous materials of indefinite purity it is also difficult to establish tests and standards adequate to enable safe and effective therapeutic use of the material.

The crystalline streptomycin hydrochloride-calcium chloride complex salt has been prepared and while this crystalline material avoids some of the difficulties above mentioned, the inclusion of calcium chloride renders data relating to the complex salt of questionable value as a means for standardizing streptomycin in therapeutic application.

Over an extended period of time many attempts have been made to prepare streptomycin hydrochloride in crystalline form. Repeated failures in such attempts, however, tended to indicate that this product was one which could not be obtained in crystalline form. Similar difficulty was also experienced in attempting to prepare the related compound dihydrostreptomycin hydrochloride in crystalline form. A way has now been found, as disclosed in my co-pending application Serial No. 31,200, filed June 4, 1948, now abandoned, for obtaining seed crystals of dihydrostreptomycin hydrochloride and using these seed crystals in preparing large quantities of crystalline dihydrostreptomycin hydrochloride.

As a result of the final success in preparing crystalline dihydrostreptomycin hydrochloride, further extensive efforts were made to prepare streptomycin hydrochloride in crystalline form. Methanol solutions of streptomycin hydrochloride of different concentrations were prepared and acetone added to each solution until a distinct turbidity persisted. The solutions were then set aside and examined and scratched from time to time. After a period of about 3 months crystals were observed in one of the solutions, i. e. the solution originally prepared containing 40 mg. of streptomycin hydrochloride per cc. of methanol and to which approximately 5 volumes of acetone were added to produce the initial turbidity. These first crystals of streptomycin hydrochloride were employed to seed other methanol solutions of streptomycin hydrochloride made turbid with acetone, and these solutions were allowed to stand, yielding substantial quantities of crystalline streptomycin hydrochloride.

For crystallization of streptomycin hydrochloride in accordance with the present invention, an essentially anhydrous solution of streptomycin hydrochloride in methanol is prepared. It is preferable that the streptomycin hydrochloride be in a relatively pure form and that the solution be a highly concentrated solution. Upon seeding with crystals of the compound and stirring, crystalline streptomycin hydrochloride is obtained. The rate of crystallization is materially speeded up by decreasing the relative amount of methanol in the solution so that a condition of supersaturation is obtained. This can be achieved in a number of ways, as for example, by adding additional streptomycin hydrochloride or evaporating part of the methanol until the amount of streptomycin hydrochloride ranges from 200 to 500 mg./ml.

When treating more dilute solutions, however, the supersaturation can be obtained by adding a solvent miscible with the methanol in which the streptomycin hydrochloride is relatively insoluble. A large number of solvents are suitable for this purpose, the most satisfactory being acetone and isopropanol. The amount of added solvent will, of course, depend on the particular solvent selected and the starting concentration of streptomycin hydrochloride in methanol. It is found, however, that when a proper degree of supersaturation is produced in the crystallization mixture, as evidenced by the appearance of distinct turbidity in the mixture, a yield of about 65 to 70% of crystalline product is readily obtained.

In order to foster maximum crystal formation the crystallization mixture after seeding is allowed to stand with frequent shaking or agitation for a period of about 3 to 5 days.

The crystalline product thus recovered is essentially pure except for traces of solvent which may cling to the crystals. It should also be noted that by concentrating the mother liquors remaining after the removal of the first crop of crystals and proceeding as before additional quantities of crystalline product can be obtained which bring the overall yield of crystalline streptomycin hydrochloride to about 90% or possibly even higher.

The crystalline product contains methanol of crystallization approximately equivalent to one mole of methanol per mole of streptomycin. The methanol may be nearly removed by drying at 100°, and methanol analyses from 0.14 to 0.86% have been obtained on material dried at 100°. The analysis of the product after drying corresponds closely to the accepted formula of streptomycin, and analysis of the material containing methanol also corresponds closely.

In the routine chemical assay (ferric-maltol) and by polaragraph assay, values very close to the theoretical were obtained when the product was assayed using pure streptomycin-calcium chloride complex as the standard. The specific rotation of the dried product is about $-88°$. $[\alpha]_D^{25}$ ($c=1$ in water).

X-ray diffraction studies indicate characteristic crystalline patterns for material containing methanol; less distinct crystallinity patterns are obtained on material containing only small amounts of methanol. Under the microscope the crystals appear to be small wedges or needles. The dried product retains its birefringence.

Crystalline streptomycin hydrochloride exhibits the following crystalline characteristics:

X-ray diffraction pattern spacings and relative intensities measured by the Norelco-Geiger-counter X-ray spectrometer are tabulated below for a sample of streptomycin trihydrochloride dried at room temperature.

| Spacing, Å | Relative Intensity Per Cent |
| --- | --- |
| 8.95 | 100 |
| 8.76 | 67 |
| 5.23 | 50 |
| 4.97 | 67 |
| 4.58 | 90 |
| 4.17 | 60 |
| 3.82 | 70 |
| 3.16 | 80 |
| 3.08 | 30 |
| 2.97 | 30 |
| 2.85 | 25 |
| 2.76 | 40 |
| 2.68 | 30 |

Other crystalline characteristics are as follows:

Indicies of refraction $\begin{cases} \alpha = 1.520 \pm 0.002 \\ \beta = 1.532 \pm 0.002 \\ \gamma = 1.562 \pm 0.002 \end{cases}$ Birefringence _____ +0.018
Axial angle 2V (calc'd) __ 66°
Extinction _____ Parallel
Sign of elongation _____ Positive
Pleochroism _____ Absent
Crystal system _____ Probably orthorhombic Not only does the new crystalline streptomycin hydrochloride facilitate better standardization and control of the product, but it has also been found that the crystalline material is a better substance to use in solution for parenteral injection.

The following examples show how the process of the present invention can be carried out, but it is to be understood that these examples are given by way of illustration and not of limitation:

Example 1

A solution of 40 gm. of streptomycin hydrochloride in 160 cc. of methanol was seeded with crystalline streptomycin hydrochloride and stirred for 3 days. The product was filtered and dried, yielding 26 gm. (65% yield) of crystalline product. After drying at 100° the material had the following analysis which agrees closely to the accepted formula of streptomycin hydrochloride.

| | C | H | N |
| --- | --- | --- | --- |
| Analysis: | | | |
| Calculated | 36.50 | 6.13 | 14.19 |
| Found | 36.61 | 5.88 | 13.96 |

Example 2

A methanol solution of streptomycin hydrochloride (1 gm. in 10 cc.) was diluted with isopropanol until a faint turbidity was present (about 4 cc. was required) and the mixture seeded with streptomycin hydrochloride crystals. Good crystalline growth was obtained after about 4 days standing at room temperature.

Similarly a solution of the same concentration was diluted with acetone (about 5 cc.) and allowed to crystallize. Crystallization proceeded at a slow rate but was complete after standing about 7 days.

Example 3

A saturated solution of 150 gm. of crystalline streptomycin hydrochloride in 2600 cc. of boiling methanol was filtered and concentrated in vacuo to 750 cc. The concentrated solution was seeded with crystalline streptomycin and stirred for 72 hours at room temperature. The product was filtered, washed with 130 cc. of 70-30 methanol-acetone, then with 150 cc. of 50-50 methanol-acetone and dried at room temperature in vacuo, yield 99.8 gm. (67% weight yield). The assay data is tabulated:

| | Total solids | | (Chemical Assay) | | |
| --- | --- | --- | --- | --- | --- |
| | mg./cc. | T. weight | u./cc. | T. Units | Per Cent |
| Concentrate before crystallization | 200 | gm. 150 | 167,000 | 120×10⁶ | |
| Mother liquor, after crystallization | 80.7 | 41 | 59,500 | 30.2×10⁶ | 25 |
| Washes | | | 3,300 | 8.2×10⁶ | 6.8 |
| Total Product | | 99.8 | 785 u./mg. | 78×10⁶ | 65 |
| Precipitate from mother liquor and washes | | 46.6 | 665 u./mg. | 31×10⁶ | 26 |

It has been found that when a number of crystallizations of streptomycin hydrochloride have been made in a particular environment, it is sometimes possible to produce additional crystalline streptomycin hydrochloride without the actual addition of seed crystals to the supersaturated solution. This is probably due to the presence of traces of crystalline streptomycin hydrochloride on the equipment or in the atmosphere in which the crystallizations are carried out. In order to provide maximum control of the crystallization and to effect crystallization in the shortest possible time, however, it is preferable to add seed crystals to the supersaturated solution rather than to rely on traces of seed crystals present in the environment.

Various changes and modifications in the foregoing procedure will occur to those versed in the art, and to the extent that such changes and modifications fall within the purview of the appended claims it is to be understood that they constitute part of my invention.

I claim:

1. The process for preparing crystalline streptomycin hydrochloride that comprises dissolving amorphous streptomycin hydrochloride in methanol to form a solution of approximately 40 mg./cc. concentration, diluting a volume of said solution with approximately five volumes of acetone, and allowing the resulting turbid solution to stand for an extended period of time with occasional scratching until crystals are formed.

2. The process for preparing crystalline streptomycin hydrochloride that comprises dissolving amorphous streptomycin hydrochloride in methanol to form a solution of approximately 40 mg./cc. concentration, diluting a volume of said solution with approximately five volumes of acetone, allowing the resulting turbid solution to stand for an extended period of time with occasional scratching to induce crystal formation, removing the resulting crystals of streptomycin hydrochloride containing one mole of methanol of crystallization, and drying the same at 100° C. to obtain crystals of substantially methanol free streptomycin hydrochloride.

3. The process for preparing crystalline streptomycin hydrochloride that comprises dissolving amorphous streptomycin hydrochloride in methanol to form a solution of approximately 40 mg./cc. concentration, diluting a volume of said solution with approximately five volumes of acetone, allowing the resulting turbid solution to stand for an extended period of time with occasional scratching until crystals are formed, and utilizing the crystals thus obtained to seed a supersaturated methanolic solution of streptomycin hydrochloride in the production of additional crystalline streptomycin hydrochloride.

4. The process for preparing crystalline streptomycin hydrochloride that comprises dissolving amorphous streptomycin hydrochloride in methanol to form a solution of approximately 40 mg./cc. concentration, diluting a volume of said solution with approximately five volumes of acetone, allowing the resulting turbid solution to stand for an extended period of time with occasional scratching until crystals are formed, utilizing the crystals thus obtained to seed a supersaturated methanolic solution of streptomycin hydrochloride in the production of additional crystalline material, and drying said crystalline material at about 100° C. to obtain substantially methanol free crystalline streptomycin hydrochloride.

FRANK J. WOLF.

REFERENCES CITED

The following references are of record in the file of this patent:

UNITED STATES PATENTS

| Number | Name | Date |
|---|---|---|
| 2,446,102 | Peck | July 27, 1948 |
| 2,462,175 | Folkers | Feb. 22, 1949 |

OTHER REFERENCES

Le Page et al., J. Biol. Chem. v. 162 (1946), pages 167, 170, 2 pages.

Kuehl et al., Science, v. 102 (1945), pages 34–45, 2 pages.

Peck et al., Jour. Amer. Chem. Soc., vol. 67, pgs. 1866–1867 (1945).

Peck et al., Jour. Amer. Chem. Soc., vol. 68, pgs. 772–776 (1946).

Kuehl et al., Jour. Amer. Chem Soc., vol. 68, pgs. 1460–1462 (1946).

Mac Ardle, Solvents in Synthetic Organic Chemistry, pgs. 147–148 (1925), pub. D. Van Nostrand, N. Y. C.